United States Patent
Hsun

(10) Patent No.: US 10,419,444 B2
(45) Date of Patent: Sep. 17, 2019

(54) SYSTEMS AND METHODS FOR PROTECTING MESSAGES UTILIZING A HIDDEN RESTRICTION MECHANISM

(71) Applicant: Cyberlink Corp., Shindian, Taipei (TW)

(72) Inventor: Chen Yen Hsun, Taipei (TW)

(73) Assignee: CYBERLINK CORP., Shindian, Taipei (TW)

( * ) Notice: Subject to any disclaimer, the term of this patent is extended or adjusted under 35 U.S.C. 154(b) by 322 days.

(21) Appl. No.: 15/177,179

(22) Filed: Jun. 8, 2016

(65) Prior Publication Data

US 2017/0063876 A1     Mar. 2, 2017

Related U.S. Application Data

(60) Provisional application No. 62/208,952, filed on Aug. 24, 2015.

(51) Int. Cl.
*H04L 29/06* (2006.01)
*H04L 12/58* (2006.01)
(Continued)

(52) U.S. Cl.
CPC ............ *H04L 63/108* (2013.01); *G06F 21/62* (2013.01); *H04L 51/04* (2013.01); *H04L 51/12* (2013.01);
(Continued)

(58) Field of Classification Search
CPC ...... G06F 21/62; G06F 21/6209; G06F 21/32; G06F 21/604; G06F 2203/04808;
(Continued)

(56) References Cited

U.S. PATENT DOCUMENTS 6,766,456 B1 * 7/2004 McKeeth ............... G06F 21/31
                                                                713/168
6,895,514 B1 * 5/2005 Kermani ............... G06F 21/316
                                                                 726/19
(Continued)

FOREIGN PATENT DOCUMENTS

CN         100502425 C      1/2007
CN         102223447 B     12/2013
(Continued)

OTHER PUBLICATIONS

Convoprotect: Lock or Hide Individual Conversations in Messages, Whatsapp and Kik, http://www.idownloadblog.com/2014/08/01/convoprotect/; Aug. 1, 2014.
(Continued)

*Primary Examiner* — Tae K Kim
(74) *Attorney, Agent, or Firm* — McClure, Qualey & Rodack, LLP

(57) ABSTRACT

A computing device executing an instant messaging application receives a selection from a user specifying at least one instant message conversation record to hide from view. The selected conversation record is hidden from view in response to occurrence of an event of a first type. In response to the occurrence of an event of a second type, a timer hidden from the user is launched. An unlock procedure is received from the user, where the user enters the unlock procedure. In response to the entered unlock procedure matching a predetermined unlock procedure prior to expiration of the timer, the corresponding hidden conversation record is made viewable and is accessible again by the user.

24 Claims, 15 Drawing Sheets

(51) Int. Cl.
*H04W 12/08* (2009.01)
*H04W 12/06* (2009.01)
*H04W 76/10* (2018.01)
*G06F 21/62* (2013.01)

(52) U.S. Cl.
CPC ............ *H04L 51/14* (2013.01); *H04L 63/083* (2013.01); *H04L 63/0861* (2013.01); *H04W 12/06* (2013.01); *H04W 12/08* (2013.01); *H04W 76/10* (2018.02); *G06F 2221/032* (2013.01)

(58) Field of Classification Search
CPC ......... H04L 51/04; H04L 51/22; H04L 51/12; H04L 63/083; H04L 63/08; H04L 63/10
See application file for complete search history.

(56) References Cited

U.S. PATENT DOCUMENTS

| | | | | |
|---|---|---|---|---|
| 7,089,583 B2* | 8/2006 | Mehra | ............... | G06F 9/4488 726/3 |
| 7,765,267 B2* | 7/2010 | Ryan | ............... | H04L 12/1831 709/206 |
| 7,769,889 B2* | 8/2010 | Weatherford | ............ | G06F 21/31 709/238 |
| 7,949,107 B2* | 5/2011 | Boss | ............... | H04L 51/04 379/88.22 |
| 8,176,547 B2* | 5/2012 | McKeeth | ............... | G06F 21/31 713/182 |
| 8,214,440 B2* | 7/2012 | Lyle | ............... | H04L 51/04 709/204 |
| 8,732,827 B1 | 5/2014 | Zhukov et al. | | |
| 8,769,669 B2* | 7/2014 | Le | ............... | G06F 21/316 726/19 |
| 8,892,901 B2* | 11/2014 | Han | ............... | G06F 21/6209 380/30 |
| 9,600,680 B2* | 3/2017 | Rakshit | ............... | G06F 21/6218 |
| 9,665,178 B2* | 5/2017 | Bukurak | ............... | G06F 3/017 |
| 9,977,909 B1* | 5/2018 | Austin | ............... | G06F 21/606 |
| 2001/0032232 A1* | 10/2001 | Zombek | ............... | H04L 1/1635 709/201 |
| 2002/0112186 A1* | 8/2002 | Ford | ............... | H04L 63/101 726/7 |
| 2004/0054929 A1* | 3/2004 | Serpa | ............... | G06F 21/31 726/5 |
| 2004/0083297 A1* | 4/2004 | Gazzetta | ............... | H04L 51/04 709/229 |
| 2005/0149762 A1* | 7/2005 | Smith | ............... | G06F 21/31 726/19 |
| 2005/0235364 A1* | 10/2005 | Wilson | ............... | G06F 21/604 726/28 |
| 2005/0250473 A1* | 11/2005 | Brown | ............... | H04L 9/3271 455/411 |
| 2006/0026689 A1* | 2/2006 | Barker | ............... | G06F 21/31 726/26 |
| 2007/0223685 A1* | 9/2007 | Boubion | ............... | G06F 21/31 380/2 |
| 2008/0256190 A1* | 10/2008 | Ryan | ............... | H04L 12/1831 709/206 |
| 2010/0217809 A1 | 8/2010 | Vymenets et al. | | |
| 2010/0328032 A1* | 12/2010 | Rofougaran | ............ | G06F 21/32 340/5.82 |
| 2011/0035591 A1* | 2/2011 | Dudziak | ............... | H04L 63/045 713/168 |
| 2012/0115435 A1* | 5/2012 | Oren | ............... | H04M 1/2745 455/410 |
| 2012/0129511 A1* | 5/2012 | Hsu | ............... | H04M 1/66 455/418 |
| 2012/0151400 A1* | 6/2012 | Hong | ............... | G06F 3/04817 715/769 |
| 2012/0192287 A1* | 7/2012 | Cai | ............... | G06F 21/606 726/28 |
| 2013/0174275 A1* | 7/2013 | Micucci | ............... | H04L 67/1044 726/28 |
| 2013/0179800 A1 | 7/2013 | Jeong et al. | | |
| 2013/0205387 A1* | 8/2013 | Le | ............... | G06F 21/316 726/19 |
| 2013/0227705 A1 | 8/2013 | Yoon et al. | | |
| 2013/0283387 A1* | 10/2013 | Wang | ............... | G06F 21/6209 726/26 |
| 2013/0326221 A1* | 12/2013 | Murphy | ............... | H04L 51/24 713/168 |
| 2014/0040756 A1* | 2/2014 | Bukurak | ............... | G06F 3/017 715/741 |
| 2014/0040769 A1* | 2/2014 | Lazaridis | ............... | G06F 3/0483 715/752 |
| 2014/0047358 A1* | 2/2014 | Park | ............... | H04M 1/72552 715/758 |
| 2014/0208095 A1* | 7/2014 | Stuntebeck | ............... | H04L 63/06 713/152 |
| 2014/0256295 A1 | 9/2014 | Peng et al. | | |
| 2016/0072748 A1* | 3/2016 | Saar | ............... | H04L 51/32 455/414.1 |
| 2016/0241530 A1* | 8/2016 | Andreev | ............... | H04L 51/12 |
| 2016/0344720 A1* | 11/2016 | Nayak | ............... | H04L 63/083 |
| 2017/0126608 A1* | 5/2017 | Friend | ............... | H04L 51/22 |

FOREIGN PATENT DOCUMENTS

| | | |
|---|---|---|
| CN | 103500302 A | 1/2014 |
| CN | 103986840 A | 8/2014 |
| CN | 104202735 A | 12/2014 |
| CN | 102509055 B | 4/2015 |
| EP | 2699029 A1 | 2/2014 |
| WO | 2013179304 A2 | 12/2013 |
| WO | 2015043189 A1 | 4/2015 |

OTHER PUBLICATIONS

"Use 'Hidden Mode' In Hike Messenger to Lock Chats With a Password", https://www.techmesto.com/hidden-mode-hike-messenger/; and "Features That Make Hike Messenger Win Over Whatsapp", http://webtrickz.com/why-hike-messenger-is-better-than-whatsapp-best-hike-features/, 2014.
SMS Vault, https://play.google.com/store/apps/details?id=com.biztech.smssecurity, 2014.
How to Lock Messages_Photos_Videos_ and Apps in Android Using NQ Vault, http://www.nq.com/vault, 2015.
Cydia App: BeyondSMS, http://dailyiphoneblog.com/2011/09/17/cydia-app-beyondsms/, 2011.
Hide SMS—Private Text Vault, http://percy-jackson-the-olympians4.android.informer.com/, 2014.
Line App Gets 'Hidden Chat' Feature for Encrypted, Ephemeral Messaging, http://gadgets.ndtv.com/apps/news/line-app-gets-hidden-chat-feature-for-encrypted-ephemeral-messaging-563268; Jul. 22, 2014.
Hidden Message Application for Android. https://trendmessagedotcom.wordpress.com/2014/12/23/hidden-message-application-for-android/; Dec. 23, 2014.
CoverMe Private Texting Messenger. https://itunes.apple.com/in/app/coverme-private-texting-secure/id593652484?mt=8 (Printed on Jun. 8, 2016).
Private Inbox—Hidden Chat. https://appworld.blackberry.com/webstore/content/132391/?lang=en (Printed on Jun. 8, 2016).
How to Lock Messages with Password on Android Phones and Tablets. http://www.techaudible.org/lock-messages-password-androis-phones-tablets/ (Printed on Jun. 8, 2016).

* cited by examiner

SYSTEMS AND METHODS FOR PROTECTING MESSAGES UTILIZING A HIDDEN RESTRICTION MECHANISM

CROSS-REFERENCE TO RELATED APPLICATION

This application claims priority to, and the benefit of, U.S. Provisional patent application entitled, "Systems and Methods for Protecting Messages Utilizing a Hidden Restriction Mechanism," having Ser. No. 62/208,952, filed on Aug. 24, 2015, which is incorporated by reference in its entirety.

TECHNICAL FIELD

The present disclosure generally relates to communications and more particularly, to systems and methods for protecting messages utilizing a hidden restriction mechanism in an instant messaging platform.

BACKGROUND

While text messaging is commonly used today on mobile devices, instant messaging remains a popular form of communications as users are able to communicate essentially in real time over a networked environment. Typically, a user initiates an instant messaging session with a remote user, where both users communicate by typing messages via a user interface, and the messages are then displayed on their respective displays. When participating in an instant messaging session, an instant message conversation record is typically generated for each contact where a log of exchanged messages is maintained. However, in some instances, users may wish to restrict access to their conversations. This may apply, for example, in the context of an enterprise network environment. For example, restricting access to conversations would be beneficial in the event that an unauthorized user gains access to a user's desktop computer as the unauthorized user would have access to potentially sensitive information by viewing unprotected conversation records.

SUMMARY

Briefly described, one embodiment, among others, is a method implemented in a media editing device for editing an image. A computing device executing an instant messaging application receives a selection from a user specifying at least one instant message conversation record to hide from view. The selected conversation record is hidden from view in response to occurrence of an event of a first type. In response to the occurrence of an event of a second type, a timer hidden from the user is launched. An unlock procedure is received from the user, where the user enters the unlock procedure. In response to the entered unlock procedure matching a predetermined unlock procedure prior to expiration of the timer, the corresponding hidden conversation record is made viewable and is accessible again by the user.

Another embodiment is a computing device that comprises a memory storing instructions and a processor coupled to the memory and configured by the instructions. The processor is configured to display a plurality of instant message conversation records, receive a selection from a user specifying at least one instant message conversation record to hide from view, and hide the selected one or more conversation records from view responsive to occurrence of an event of a first type. Responsive to occurrence of an event of a second type, the processor launches a timer, the timer being hidden from the user. The processor is further configured to receive an unlock procedure from the user, wherein the user enters the unlock procedure. Responsive to the entered unlock procedure matching one of a plurality of predetermined unlock procedures prior to expiration of the timer, the processor causes the corresponding hidden conversation record to be viewable and accessible by the user.

Another embodiment is a non-transitory computer-readable storage medium storing instructions to be implemented by a computing device having a processor. The instructions, when executed by the processor, cause the computing device to receive a selection from a user specifying at least one instant message conversation record to hide from view and hide the selected at least one conversation record from view responsive to occurrence of an event of a first type. Responsive to occurrence of an event of a second type, the computing device launches a timer, the timer being hidden from the user. The computing device receives an unlock procedure from the user, wherein the user enters the unlock procedure and responsive to the entered unlock procedure matching a predetermined unlock procedure prior to expiration of the timer, the computing device causes the corresponding hidden conversation record to be viewable and accessible by the user.

BRIEF DESCRIPTION OF THE DRAWINGS

Various aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Embodiments are disclosed for incorporating a hidden safeguard mechanism for restricting access to instant message conversation records generated during one or more instant messaging sessions conducted between a user and contacts. A user selects one or more instant message conversation records to hide and specifies one or more unlock procedures for causing the hidden instant message conversation records to become viewable again. In some embodiments, when one or more predetermined trigger events are detected, a timer is launched and the user is given an opportunity to execute the one or more specified unlock procedures before the timer expires. Instant message conversation records associated with unlock procedures that are successfully executed before the timer expires become viewable again by the user.

The unlock procedures specified by the user are fully customizable, and the same or different unlock procedures may be assigned to different instant message conversation records of groupings of instant message conversation records. For example, one unlock procedure(s) may be utilized for one grouping of instant message conversation records (e.g., business-related contacts), while another unlock procedure(s) may be utilized for another grouping of instant message conversation records (e.g., personal contacts outside of work). Furthermore, in accordance with exemplary embodiments, the user performs the one or more specified unlock procedures without being prompted. Notably, only the user is aware of the hidden conversation records, and only the user is aware that a timer is launched responsive to a trigger event and that hidden instant message conversation can be made viewable again within a time interval associated with the timer. Thus, the instant message conversation records are kept confidential and only the user who specified the unlock procedures is able to gain access to the hidden instant message conversation records. The timer interval may also be specified by the user.

Figure 1:
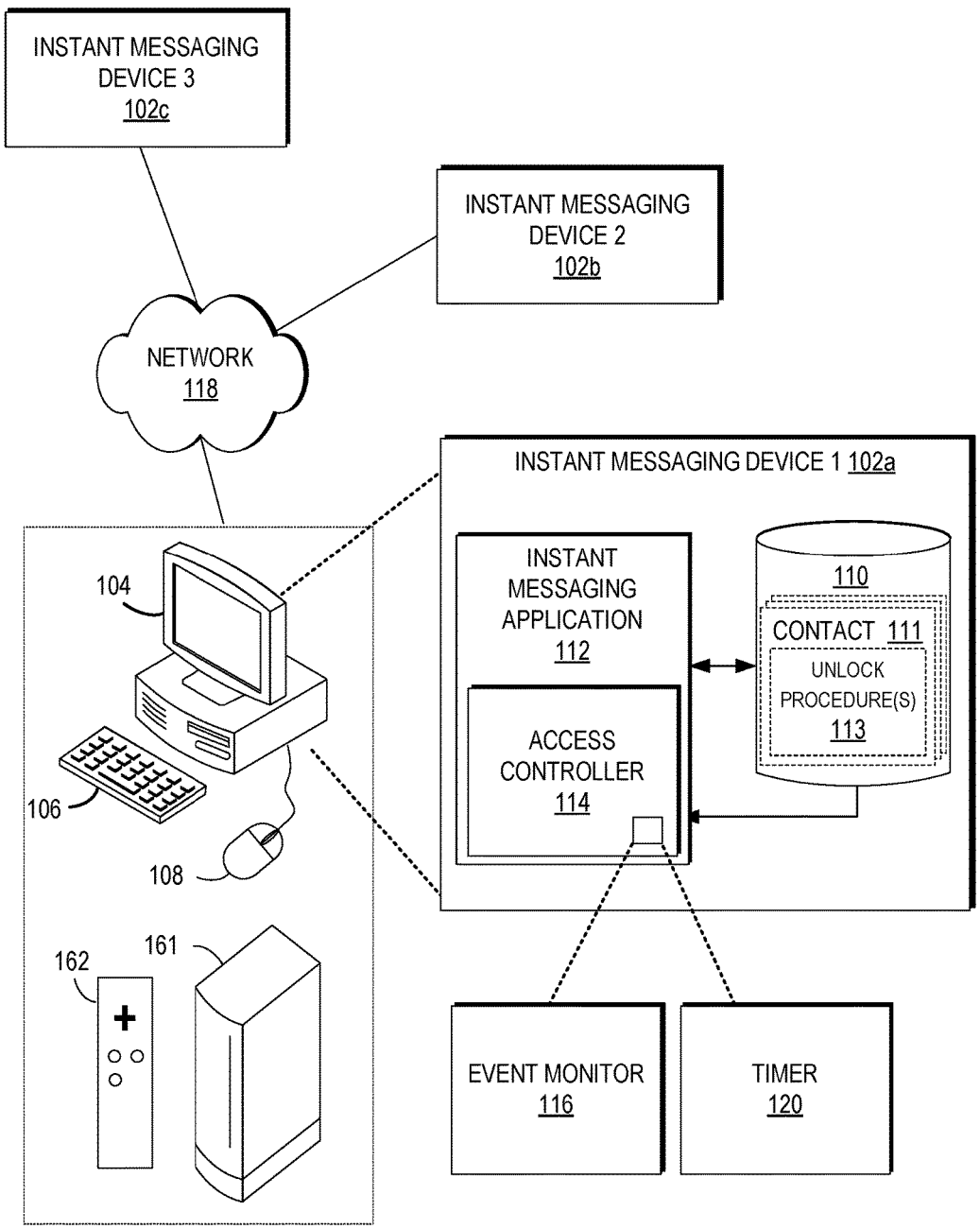
FIG. 1 is a block diagram of a networked environment in which embodiments of an instant messaging system may be implemented in accordance with various embodiments.

A description of a system for restricting access to instant message conversation records in an instant messaging platform is now described followed by a discussion of the operation of the components within the system. FIG. 1 is a block diagram of a networked environment in which instant messaging devices 102a-102c are communicatively coupled via a network 118. The network 118 includes, for example, the Internet, one or more intranets, extranets, wide area networks (WANs), local area networks (LANs), wired networks, wireless networks, other suitable networks, or any combination of two or more such networks.

Each of the instant messaging devices 102a-102c may be embodied, for example, as a desktop computer, computer workstation, laptop, smartphone, tablet computer, or other computing system. In some embodiments, the instant messaging devices 102a-102c may be embodied as a video gaming console 161, which includes a video game controller 162 for receiving user preferences. For such embodiments, the video gaming console 161 may be connected to a television (not shown) or other display.

Each of the instant messaging devices 102a-102c may include a display 104 and input devices such as a keyboard 106 and a mouse 108, and/or touchscreen. The instant messaging devices 102a-102c are coupled to the network 118 and are configured to communicate directly with each other. Each instant messaging device 102a-102c includes an instant messaging application 112 executed by a processing device in the instant messaging device 102a-102c for generating a user interface associated with instant messaging sessions and for allowing the user to perform unlocking procedures for viewing hidden conversation records.

The instant messaging device 102a-102c includes an access controller 114 executed by a processing device in the instant messaging device 102a-102c for controlling which conversation records are viewable and which conversation records remain hidden based on whether unlock procedures are successfully executed by the user within a predetermined time interval. The event monitor 116 in the access controller 114 is executed to detect the occurrence of predetermined trigger events for purposes of launching the timer 120. Once the timer 120 is launched, the access controller 114 monitors attempts by the user to unlock one or more conversation records. The conversation records may be associated with the user's contacts and the corresponding unlock procedure(s) 113 may be stored in a data store 110 maintained by the instant messaging device 102a-102c. In this regard, the data in the data store 110 is associated with the operation of the various applications and/or functional entities described below that are executed in the instant messaging device 102a-102c.

If the user successfully executes one or more unlock procedures before the time interval expires, the instant message conversation records associated with those unlock procedures are made viewable by the access controller 114 and displayed to the user utilizing the instant messaging application 112. The user may then access the conversation records and view previous exchanges with the particular contact(s). The event monitor 116 also monitors for the occurrence of predetermined trigger events for purposes of automatically hiding one or more conversation records that were previously viewable. Additional details regarding the instant messaging application 112 and the access controller 114 are described in more detail below.

Figure 2:
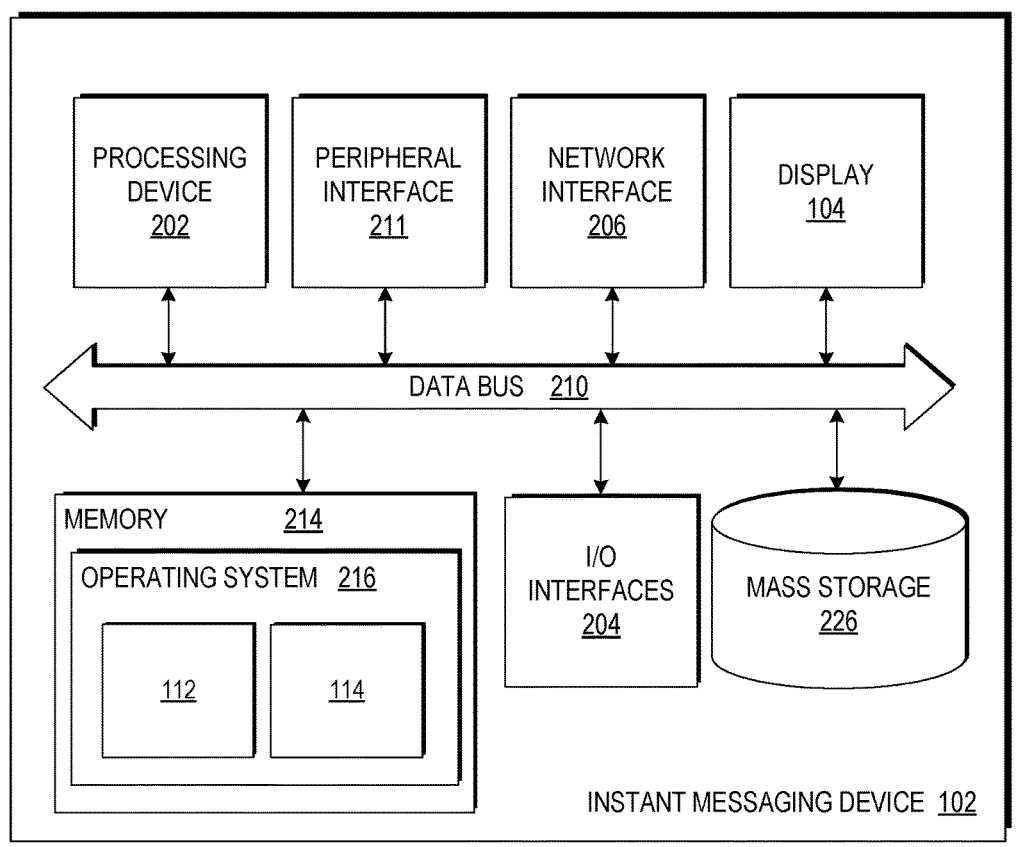
FIG. 2 illustrates an embodiment of the instant messaging devices shown in FIG. 1 in accordance with various embodiments.

FIG. 2 illustrates an embodiment of the instant messaging devices 102a-102c shown in FIG. 1. The instant messaging devices 102a-102c may be embodied in any one of a wide variety of wired and/or wireless computing devices, such as a desktop computer, portable computer, dedicated server computer, multiprocessor computing device, smart phone, tablet, and so forth. As shown in FIG. 2, each of the instant messaging devices 102a-102c comprises memory 214, a processing device 202, a number of input/output interfaces 204, a network interface 206, a display 104, a peripheral interface 211, and mass storage 226, wherein each of these components are connected across a local data bus 210.

The processing device 202 may include any custom made or commercially available processor, a central processing unit (CPU) or an auxiliary processor among several processors associated with the instant messaging devices 102a-102c, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM) such as DRAM, SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the instant messaging devices 102a-102c depicted in FIG. 1. In accordance with such embodiments, the components 112, 114 are stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the instant messaging devices 102a-102c comprises a personal computer, these components may interface with one or more user input/output interfaces 204, which may comprise a keyboard, a mouse, or a touch screen. The display 104 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3A:
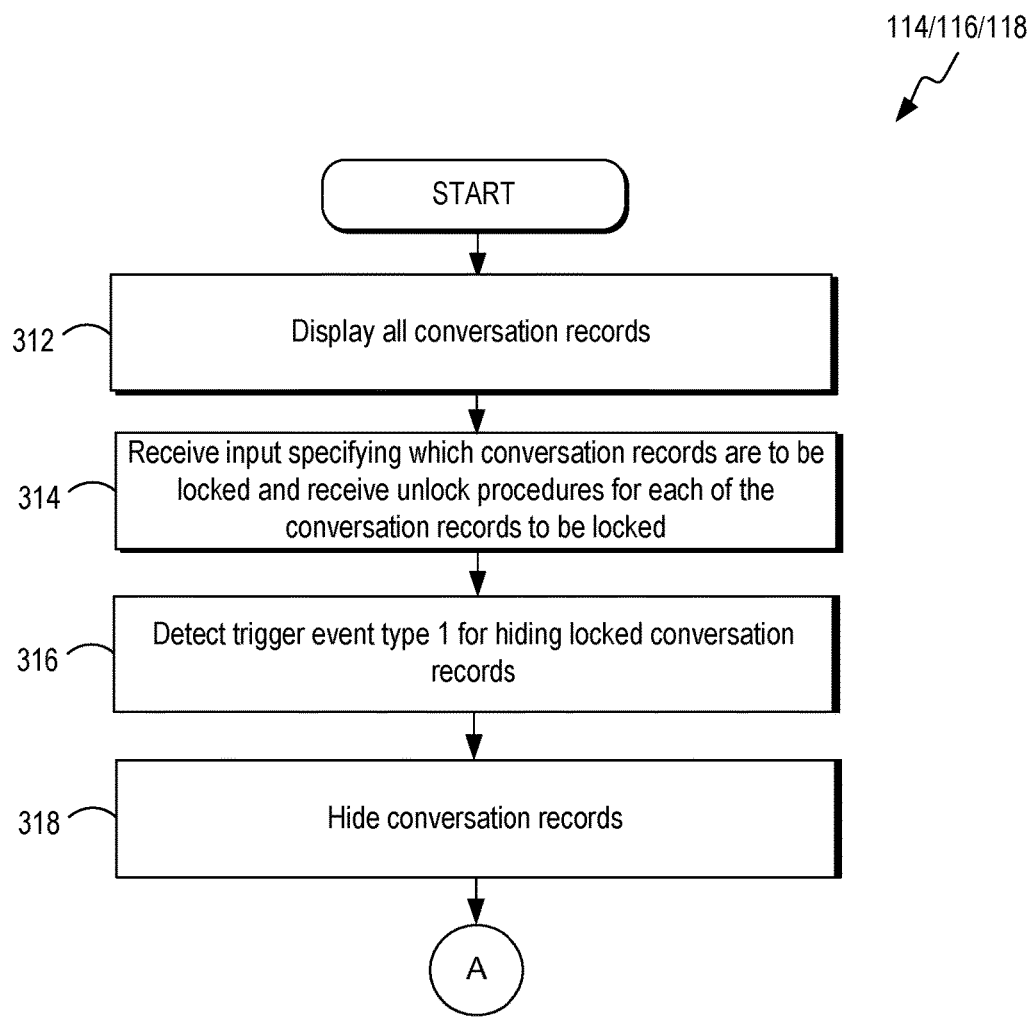
FIGS. 3A and 3B is a flowchart illustrating functionality associated with the access controller, event monitor, and timer in the instant messaging device of FIG. 1 in accordance with various embodiments.
Figure 3B:
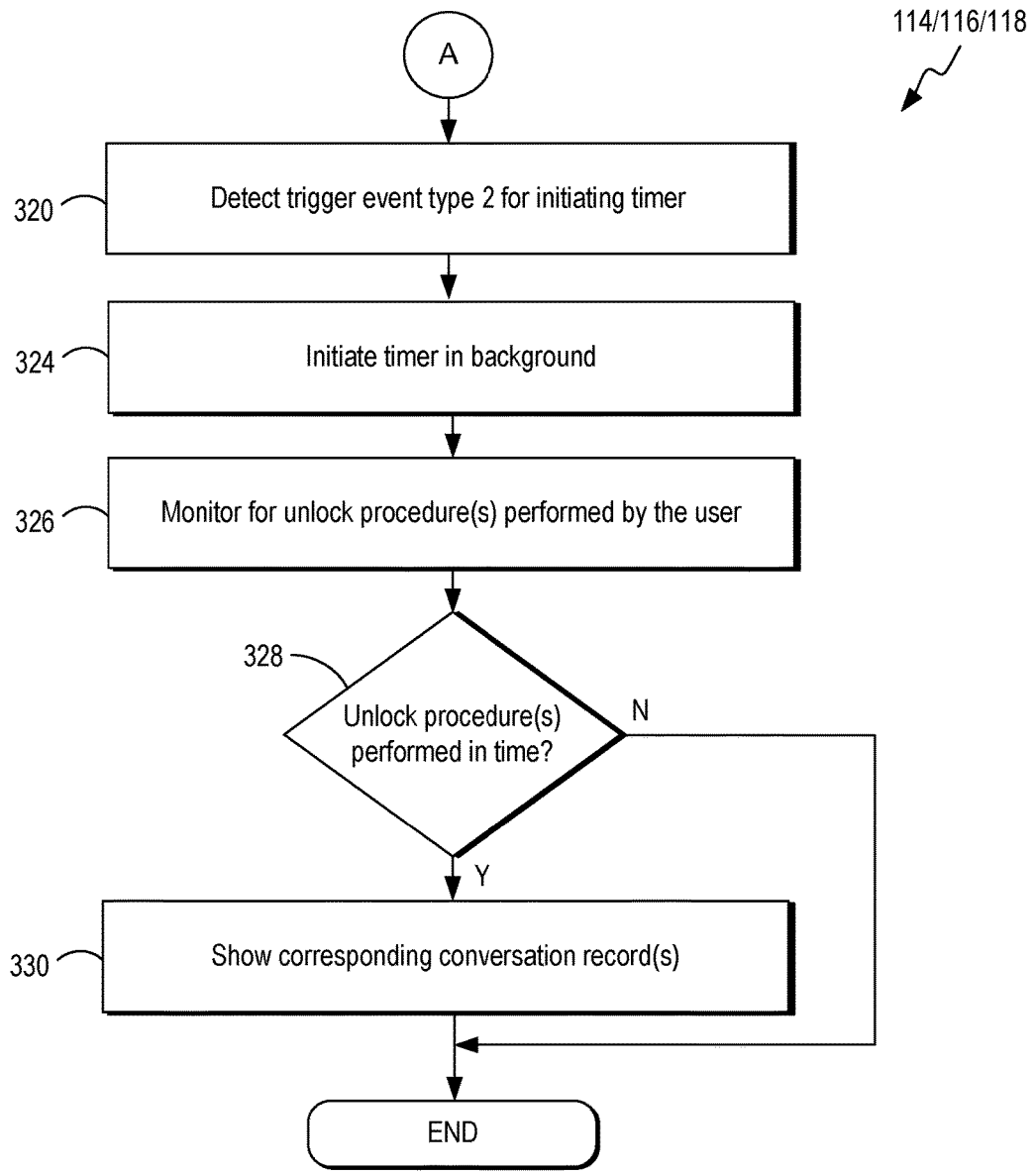

Reference is made to FIGS. 3A and 3B, which is a flowchart in accordance with some embodiments for restricting access to instant message conversation records performed the instant messaging device 102 of FIG. 1. It is understood that the flowchart of FIGS. 3A and 3B provides merely an example of the many different types of functional arrangements that may be employed to implement the operation of the access controller 114 (FIG. 1), the event monitor 116 (FIG. 1), and the timer 120 (FIG. 1) components in the instant messaging device 102. As an alternative, the flowchart of FIGS. 3A and 3B may be viewed as depicting an example of steps of a method implemented in the instant messaging device 102 according to one or more embodiments.

Although the flowchart of FIGS. 3A and 3B shows a specific order of execution, it is understood that the order of execution may differ from that which is depicted. For example, the order of execution of two or more blocks may be scrambled relative to the order shown. Also, two or more blocks shown in succession in FIGS. 3A and 3B may be executed concurrently or with partial concurrence. It is understood that all such variations are within the scope of the present disclosure.

In block 312, all instant message conversation records generated during the course of one or more instant messaging sessions are initially displayed and fully accessible by the user. In block 314, the access controller 114 receives input specifying which instant message conversation records are to be locked and then receives unlock procedures for each of the instant message conversation records to be locked. For purposes of this disclosure, trigger events associated with a first type (type 1) are utilized to hide instant message conversation records, whereas trigger events associated with a second type (type 2) are utilized to launch the timer and are associated with unlocking hidden instant message conversation records.

In block 316, the event monitor 116 detects one or more type 1 trigger events for purposes of hiding the selected instant message conversation records to be locked. The type 1 trigger event may comprise, for example, entry of one or more unlock procedures via a user interface. For example, the trigger event may comprise the user pressing the submit button for entering one or more unlock procedures. If a type 1 trigger event is detected (decision block 316), then in block 318, the selected instant message conversation records are immediately hidden.

To illustrate, the following are examples of a type 1 trigger event. Upon selecting one or more unlock procedures for a particular instant message conversation records, the user may press a "submit" user interface (UI) button to enter the unlock procedures. Manipulation of the "submit" button may be predefined as a trigger event that causes that particular instant message conversation record to be automatically hidden. Other trigger events for automatically hiding instant message conversation records (i.e., type trigger events) may also be defined. For example, minimization of the instant messaging window may also be defined as a type 1 trigger event that automatically causes instant message conversation records to be hidden. Other examples of type 1 trigger events may include but are not limited to switching from the instant messaging application to another application, leaving a current chatting window with a friend whose message should be locked, the instant messaging device 102 being turned off, the instant messaging device 102 entering sleep mode, the instant messaging device 102 entering a screen saver mode, and so on. In the context of this disclosure, leaving a current chatting window may entail switching to another tab within the UI (e.g., Options tabs or Contacts tabs) or terminating a particular conversation. Alternatively, the user may manually lock an instant message conversation record. For example, upon selecting one or more unlock procedures for a particular instant message conversation records, the user may then cause the instant message conversation records to be hidden by pressing a "lock instant message conversation record" button in a dialog box. Note that the manual locking feature may be implemented in conjunction with the use of type 1 trigger events.

Reference is made to FIG. 3B. In block 320, the event monitor 116 monitors for type 2 trigger events for purposes of displaying instant message conversation records that are now hidden. A type 2 trigger event may comprise, for example, restoring to view of a previously minimized window used for conducting an instant messaging session. Other examples of type 2 trigger events may include but are not limited to the instant messaging device 102 exiting sleep mode, the instant messaging device 102 exiting a screen saver mode, the user switching back to the instant messaging application, and so on. In block 324, the event monitor 116 detects a type 2 trigger event, and the timer 120 component is launched. The user then has a window of time specified by the timer 120 for performing one or more unlock procedures. Note that for various embodiments, the timer 120 executes in the background and is not shown to the user. Thus, only the user who specified the one or more unlock procedures is aware that the timer has been launched. The time interval of the timer 120 may be preset or configured by the user.

In block 326, the access controller 114 monitors for the execution of unlock procedure(s) by the user. In decision block 328, the access controller 114 determines if the user successfully performs at least one of the predetermined unlock procedures before the timer expires. Note that each instant message conversation record may have one or more corresponding predetermined unlock procedures. This gives the user the option of performing one of multiple predetermined unlock procedures for purposes of accessing an instant message conversation record. Alternatively, if a particular instant message conversation record contains sensitive material (e.g., business-related information), the user may specify beforehand that each of the multiple predetermined unlock procedures must be performed in order to view the hidden instant message conversation record.

If the user successfully performs at least one of the predetermined unlock procedures prior to expiration of the timer, the corresponding instant message conversation record is made viewable to the user (block 330). If the user does not successfully perform at least one of the predetermined unlock procedures prior to expiration of the timer, the corresponding instant message conversation record remains hidden. Thereafter, the process shown in FIGS. 3A and 3B ends.

Figure 4:
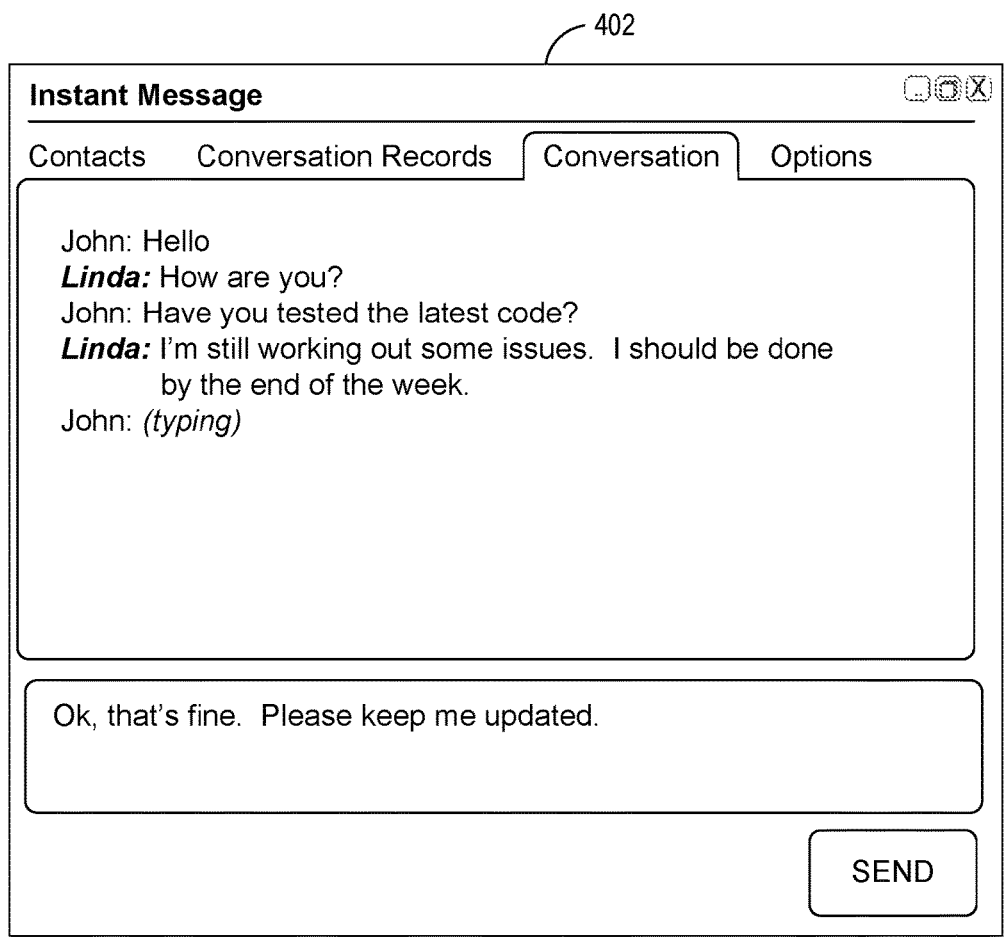
FIG. 4 illustrates an example of a user interface generated by the instant messaging application for allowing a user to participate in an instant messaging session in accordance with various embodiments.
Figure 5:
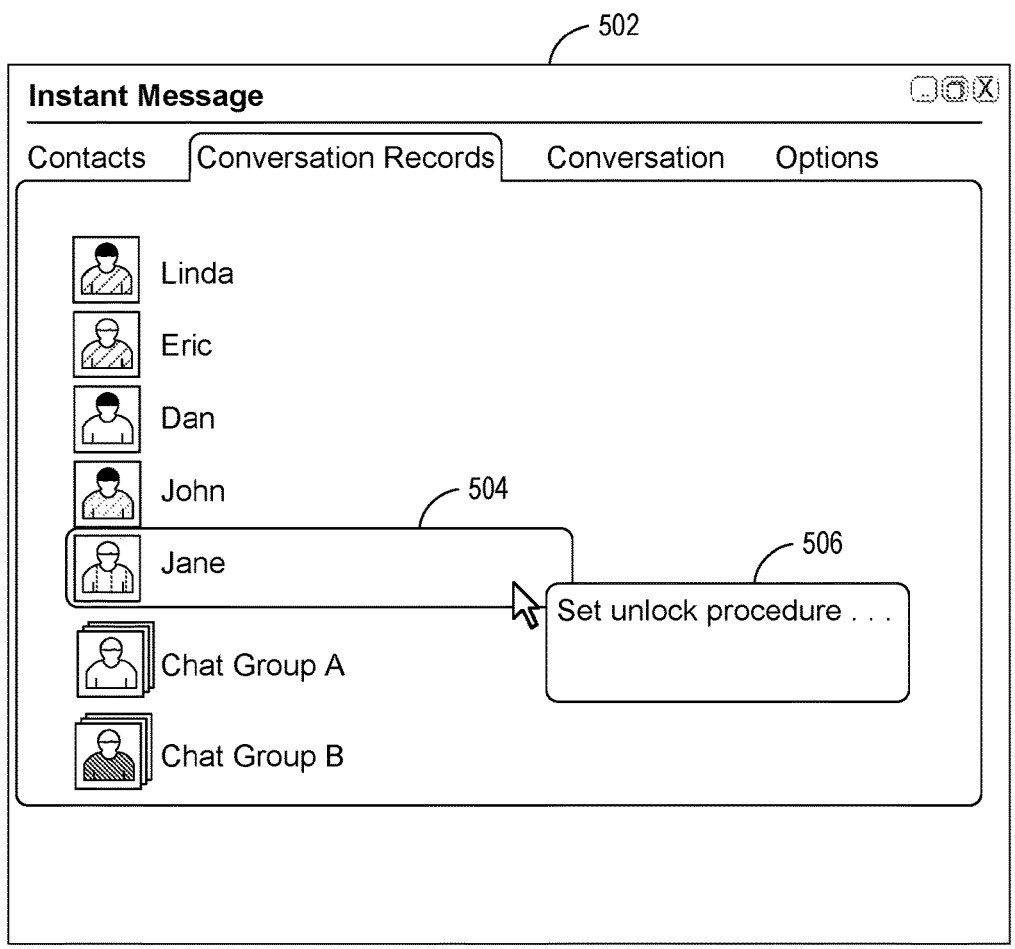
FIG. 5 illustrates an example user interface where the user selects a conversation record to be locked in accordance with various embodiments.
Figure 12:
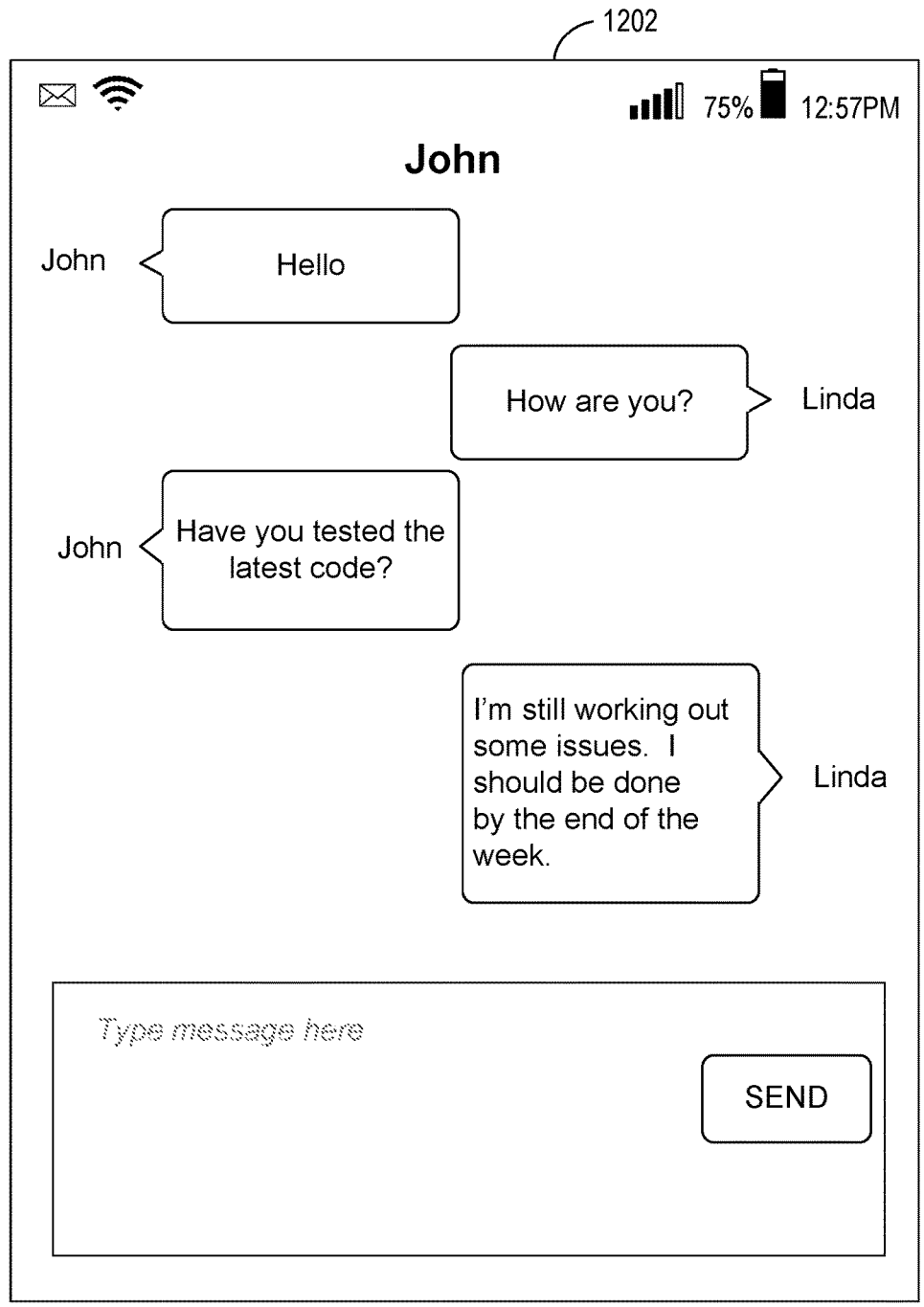
FIG. 12 illustrates another example of a user interface generated by the instant messaging application for allowing a user to participate in an instant messaging session in accordance with various embodiments.
Figure 13:
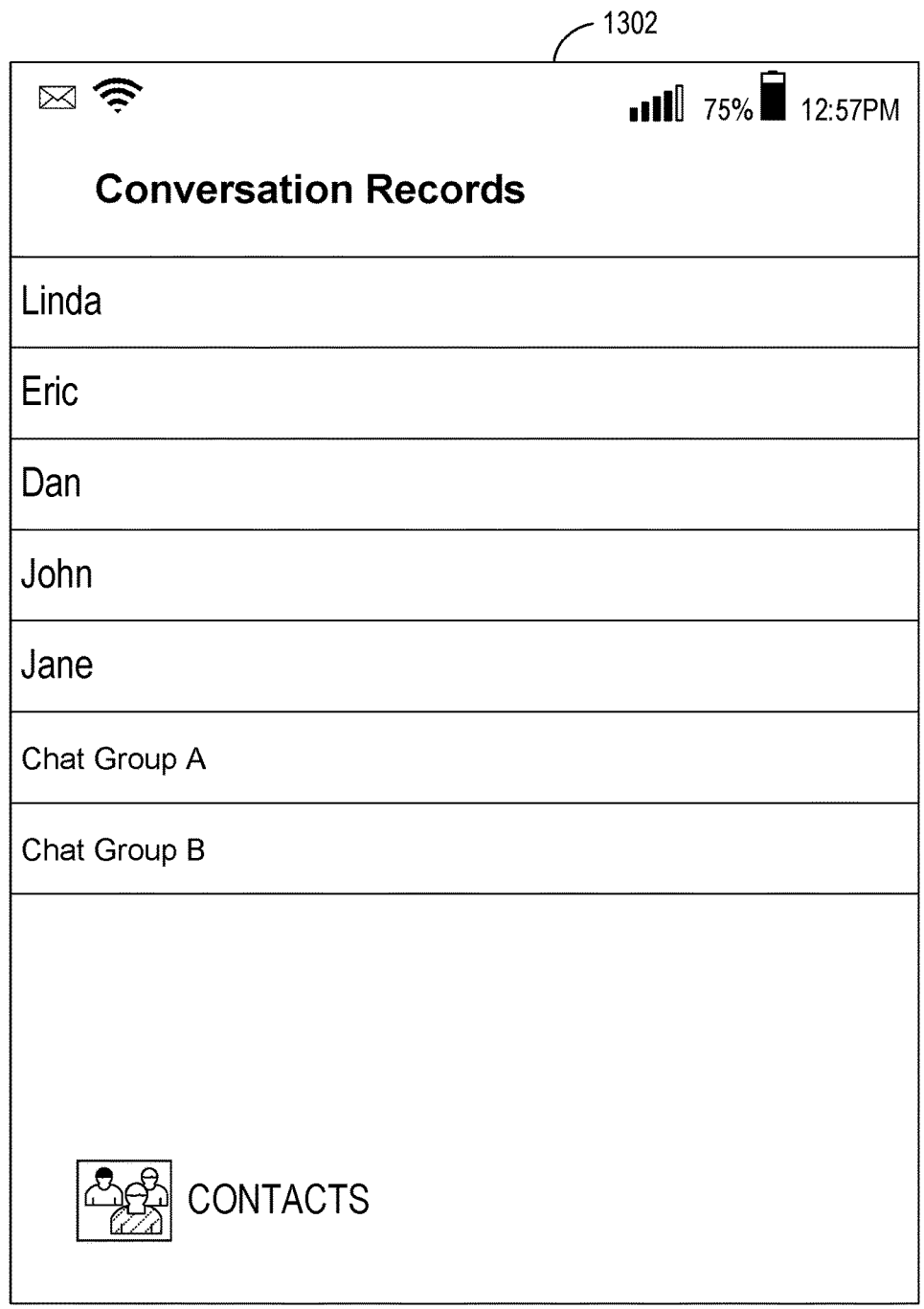
FIG. 13 illustrates another example of a user interface generated by the instant messaging application, where the user interface lists a plurality of conversation records that the user may access in accordance with various embodiments.

FIG. 4 illustrates an example of a user interface 402 generated by the instant messaging application 112 (FIG. 1) for conducting an instant messaging session. Specifically, an example of an instant message conversation record is shown whereby exchanges between two parties have taken place. FIG. 12 illustrates another example of a user interface 1202 generated by the instant messaging application (FIG. 1) for allowing a user to participate in an instant messaging session in accordance with various embodiments. FIG. 13 illustrates another example of a user interface 1302 generated by the instant messaging application (FIG. 1), where the user interface lists a plurality of conversation records that the user may access in accordance with various embodiments. FIG. 5 illustrates an example user interface 502 where the user selects an instant message conversation record 504 to be locked. In the example shown, the user invokes a menu 506 for specifying an unlock procedure for the highlighted instant message conversation record 504. The menu 506 may be invoked by performing a right mouse click, tapping on a touchscreen display, or other suitable means. Note that the user may select one or more unlock procedures.

Figure 6:
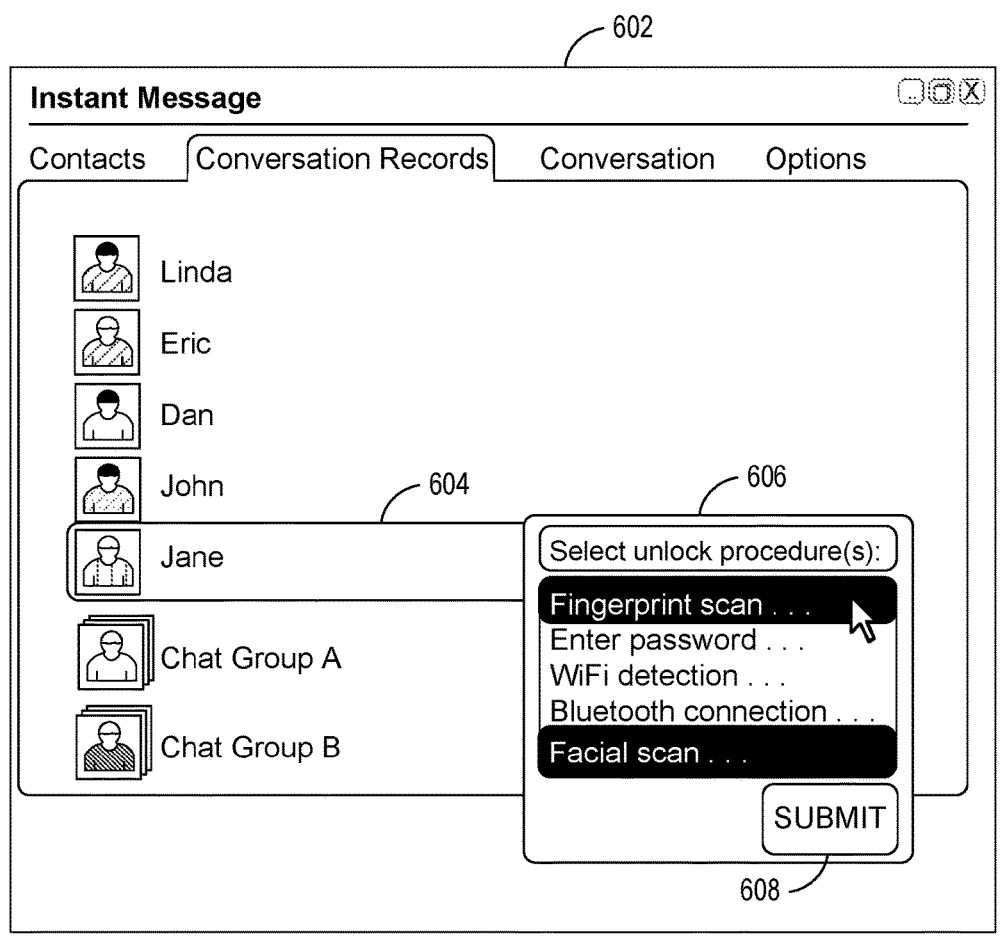
FIG. 6 illustrates an example user interface where the user selects multiple unlock procedures for a particular conversation record in accordance with various embodiments.

FIG. 6 illustrates an example user interface 602 where the user selects multiple unlock procedures for a particular instant message conversation record 604. The unlock procedures may comprise, for example, a fingerprint scan, entry of one or more gestures via a touchscreen interface, entry of a password, entry of an answer responsive to a question, facial recognition via a camera, speech recognition via a microphone, shaking the instant messaging device 102 a predetermined number of times, and so on. Other unlock procedures may include causing the instant messaging device 102 to have a particular connection status (e.g., connection of the instant messaging device 102 to a particular Wi-Fi network, connection of the instant messaging device 102 to a particular Internet service provider (ISP) account), connection or coupling of a specific device (e.g., a Bluetooth® device, a near field communication (NFC) device, a universal serial bus (USB) device) to the instant messaging device 102, placement of the instant messaging device 102 at a particular global positioning system (GPS) location, detection of an NFC tag, and so on. Note that some unlock procedures involve prompting the user to perform a certain action(s), whereas with other implementations, the user performs the action(s) without being prompted. For example, one unprompted unlock procedure comprises causing the instant messaging device 102 to have a particular connection status (e.g., connection of the instant messaging device 102 to a particular Wi-Fi network, connection of the instant messaging device 102 to a particular Internet service provider (ISP) account).

As shown in the example user interface 602, the user can select multiple unlock procedures 606. Upon selecting the desired unlock procedures, the user presses the "SUBMIT" button 608. As described earlier and as described in more detail below, pressing the "SUBMIT" button 608 or other UI button may correspond to the occurrence of a first type of event, whereby the instant message conversation record 604 is automatically hidden. In the example shown in FIG. 6, the user selects a fingerprint scan and a facial scan as the unlock procedures associated with the selected instant message conversation record 604. The user may further specify whether only one or both of these unlock procedures must be performed within the time interval in order for the selected instant message conversation record 604 will be made viewable.

Figure 7A:
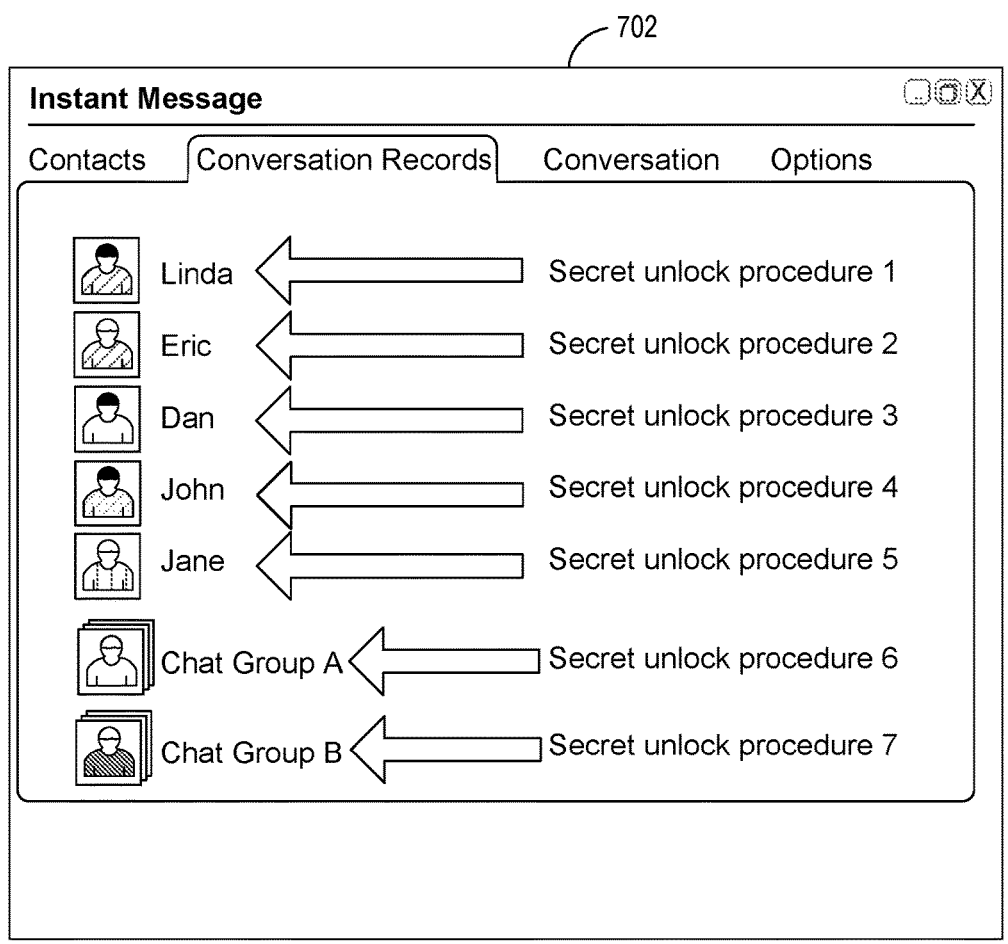
FIG. 7A illustrates how each instant message conversation record may be assigned a particular unlock procedure in accordance with various embodiments.

FIG. 7A illustrates how each instant message conversation record is assigned a particular unlock procedure, where the user can specify a different unlock procedure for each instant message conversation record. Thus, if the user wishes to unlock the instant message conversation record associated with "John", the user must successfully execute unlock procedure 4 prior to expiration of the timer. As another example, if the user wishes to unlock the instant message conversation records associated with "John" and "Jane", the user must successfully execute unlock procedure 4 and unlock procedure 5 prior to expiration of the timer.

As described in more detail below, a single timer may be utilized or alternatively, separate timers may be utilized. For example, upon successfully performing unlock procedure 4, the timer restarts and the user is given more time to perform unlock procedure 5. In other implementations, the timer does not restart, and the user must perform one or more unlock procedures within the predetermined time interval associated with the timer.

Figure 7B:
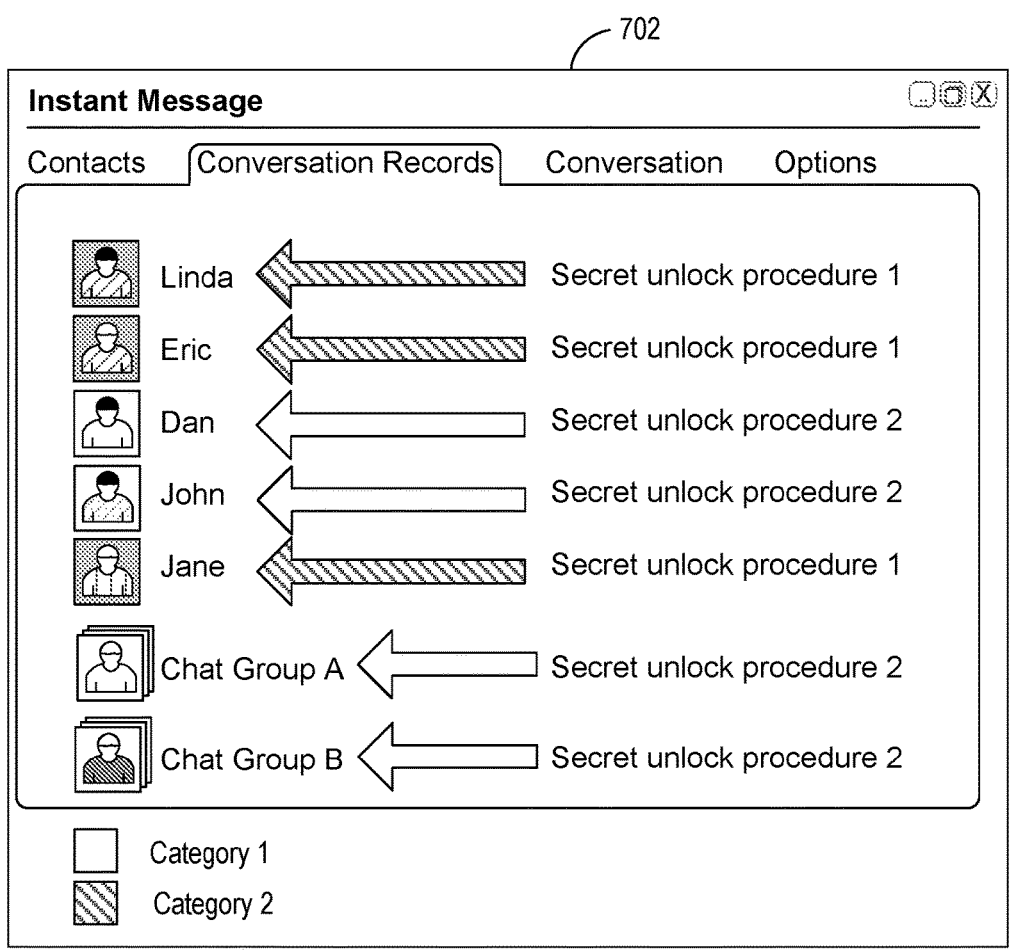
FIG. 7B illustrates how different groupings of instant message conversation records may be assigned different unlock procedures in accordance with various embodiments.

Instant message conversation records may remain locked due to expiration of the timer 120 (FIG. 1), incorrect entry of unlock procedures, and/or simply no attempt made to unlock the remaining conversation records. FIG. 7B illustrates how different groupings of instant message conversation records may assigned different unlock procedures. In some instances, it may be desirable for the user to categorize instant message conversation records according to different categories. For example, one category may correspond to business contacts (e.g., co-workers) in an enterprise environment, whereas another category may correspond to non-business contacts (e.g., family and friends outside of work). The user can specify a different unlock procedure on a group by group basis. Thus, upon successful execution of an unlock procedure associated with a particular group, all instant message conversation records associated with that particular group are unlocked.

Figure 8:
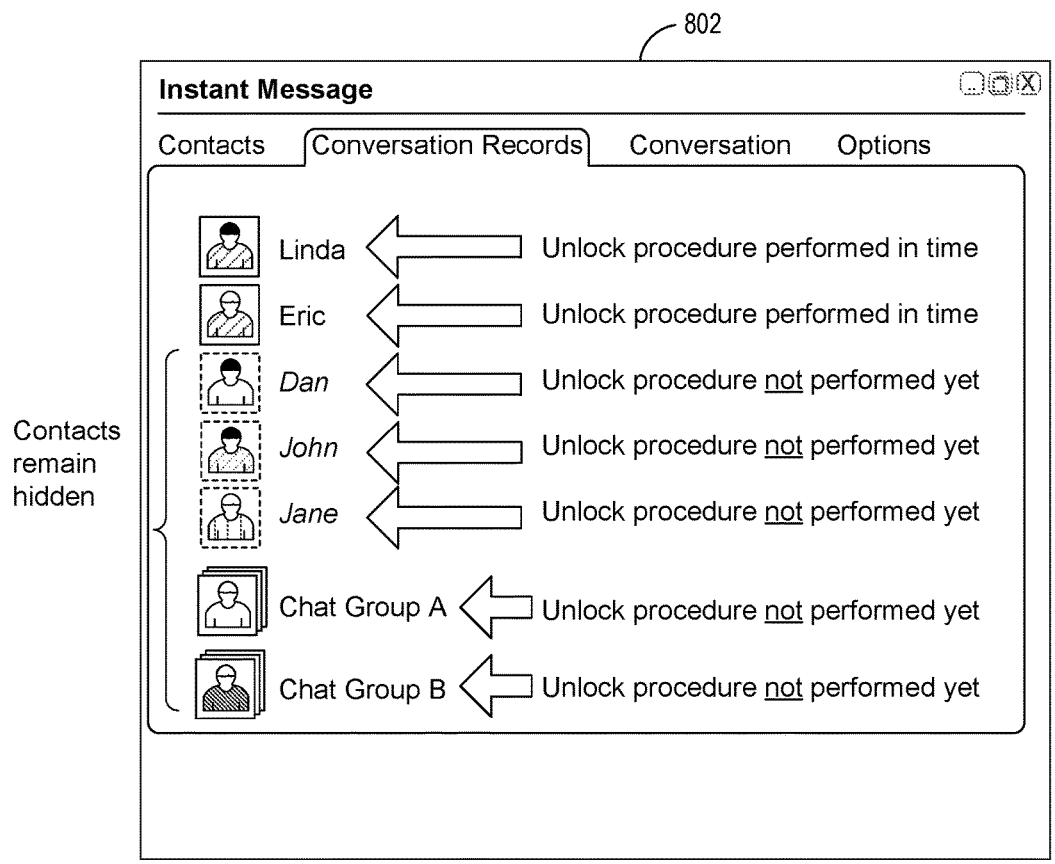
FIG. 8 illustrates how only some of the conversation records are locked and hidden due to expiration of the timer, incorrect entry of unlock procedures, and/or simply no attempt made to unlock the remaining conversation records in accordance with various embodiments.

Reference is made to the example UI 802 shown in FIG. 8. As a result of the unlock procedures associated with the bottom three conversation records not yet being performed, the bottom three conversation records remain locked. In some implementations, the timer 120 (FIG. 1) functions as a singe, global timer whereby the user is given the opportunity to unlock as many instant message conversation records as possible before the timer 120 expires. For example, suppose that the user specifies a timer value of 60 seconds. Upon the occurrence of a type 2 trigger event described earlier, the user has 60 seconds to unlock one or more of the instant message conversation records shown.

In other implementations, the timer 120 may be configured to restart once an unlock procedure associated with an instant message conversation record is successfully unlocked prior to expiration of the timer 120. For example, if the user successfully unlocks the first instant message conversation record ("Linda"), the timer 120 restarts, and the user is given a new time interval for attempting to unlock additional instant message conversation records.

Figure 9:
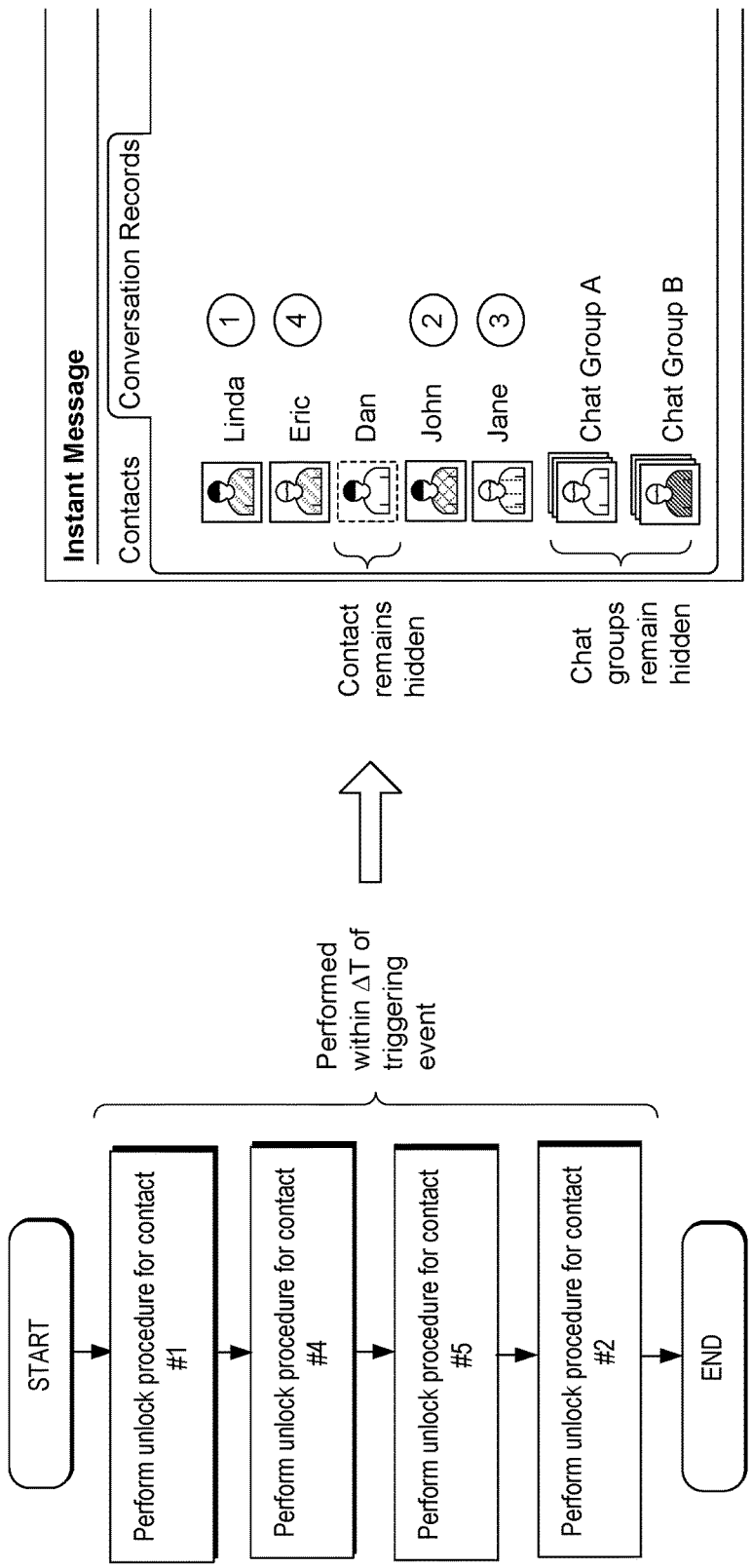
FIG. 9 illustrates an example where the conversation records are unlocked in random order in accordance with various embodiments.

FIG. 9 illustrates another aspect of various embodiments where the conversation records are unlocked in random order as the user is not restricted to unlocking conversation records in a top-down order. Instead, the user can unlock conversation records in any desired order. In the example shown in FIG. 9, the timer 120 (FIG. 1) functions as a single, global timer. As described above, however, the timer 120 may be restarted in other implementations once an unlock procedure is successfully performed so that the user is given more time to unlock additional instant message conversation records once another instant message conversation record is successfully unlocked.

Figure 10:
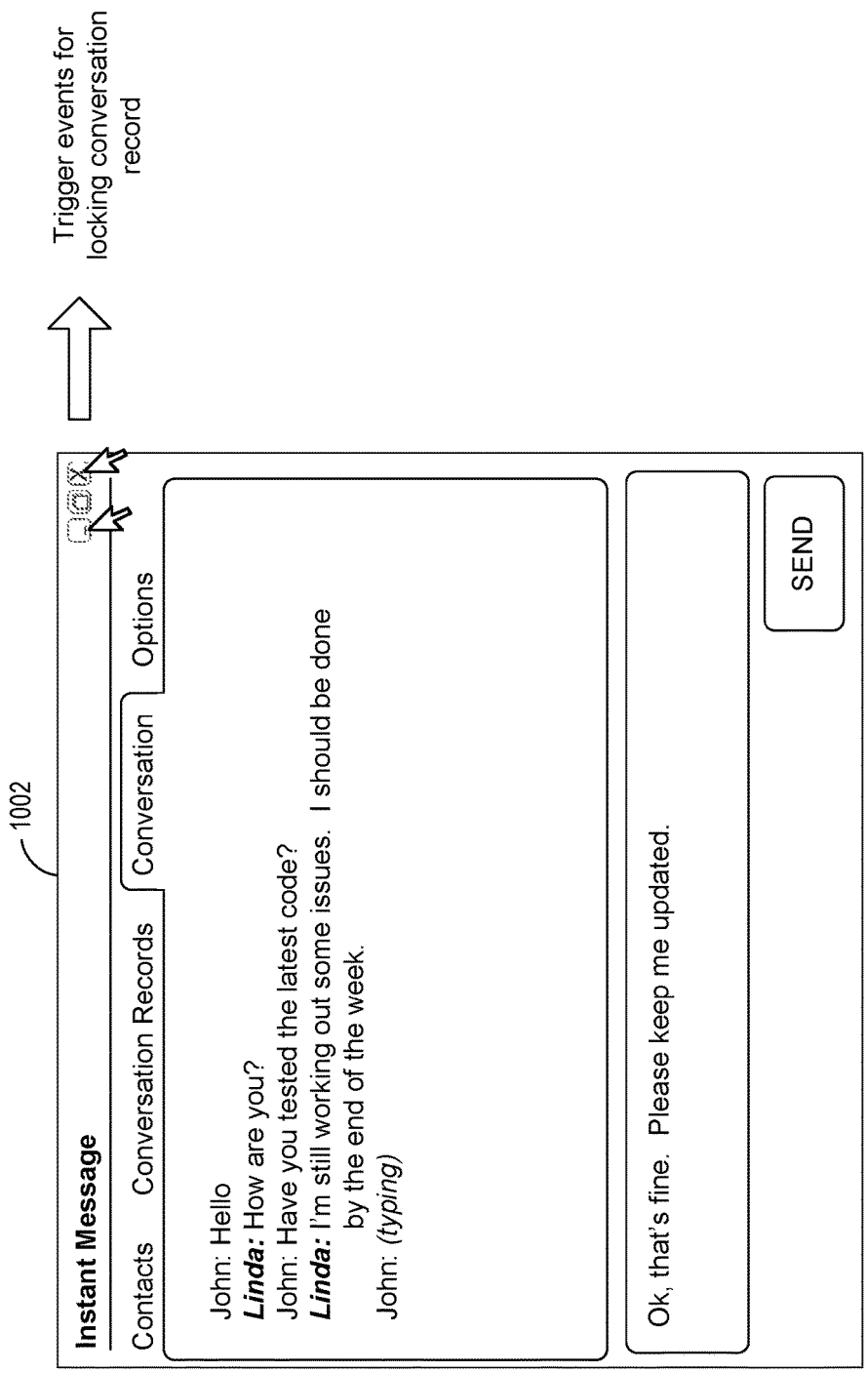
FIG. 10 illustrates examples of type 1 trigger events for purposes of locking conversation records in accordance with various embodiments.

FIG. 10 illustrates examples of an event of a first type (e.g., type 1) for purposes of locking conversation records in accordance with various embodiments. As described earlier, trigger events associated with a first type (type 1) are utilized to hide conversation records, whereas trigger events associated with a second type (type 2) are utilized to launch the timer and are associated with unlocking hidden conversation records. In the example shown, assume for purposes of illustration that the user has already specified at least one unlock procedure for the instant message conversation record 1002. Assume also that a type 1 trigger event includes, among other events, minimization of a window in which the instant message conversation record 1002 is shown.

In the example shown, upon minimization of the window using a mouse or other selection means (e.g., touchscreen display), the instant message conversation record 1002 is automatically hidden from view. At this point, only the user is aware of the hidden instant message conversation record 1002 and the corresponding unlock procedure(s) for causing the instant message conversation record to be viewable again. As discussed above, another type 1 trigger event may comprise pressing a UI button (e.g., the "Submit" button in FIG. 6).

Figure 11:
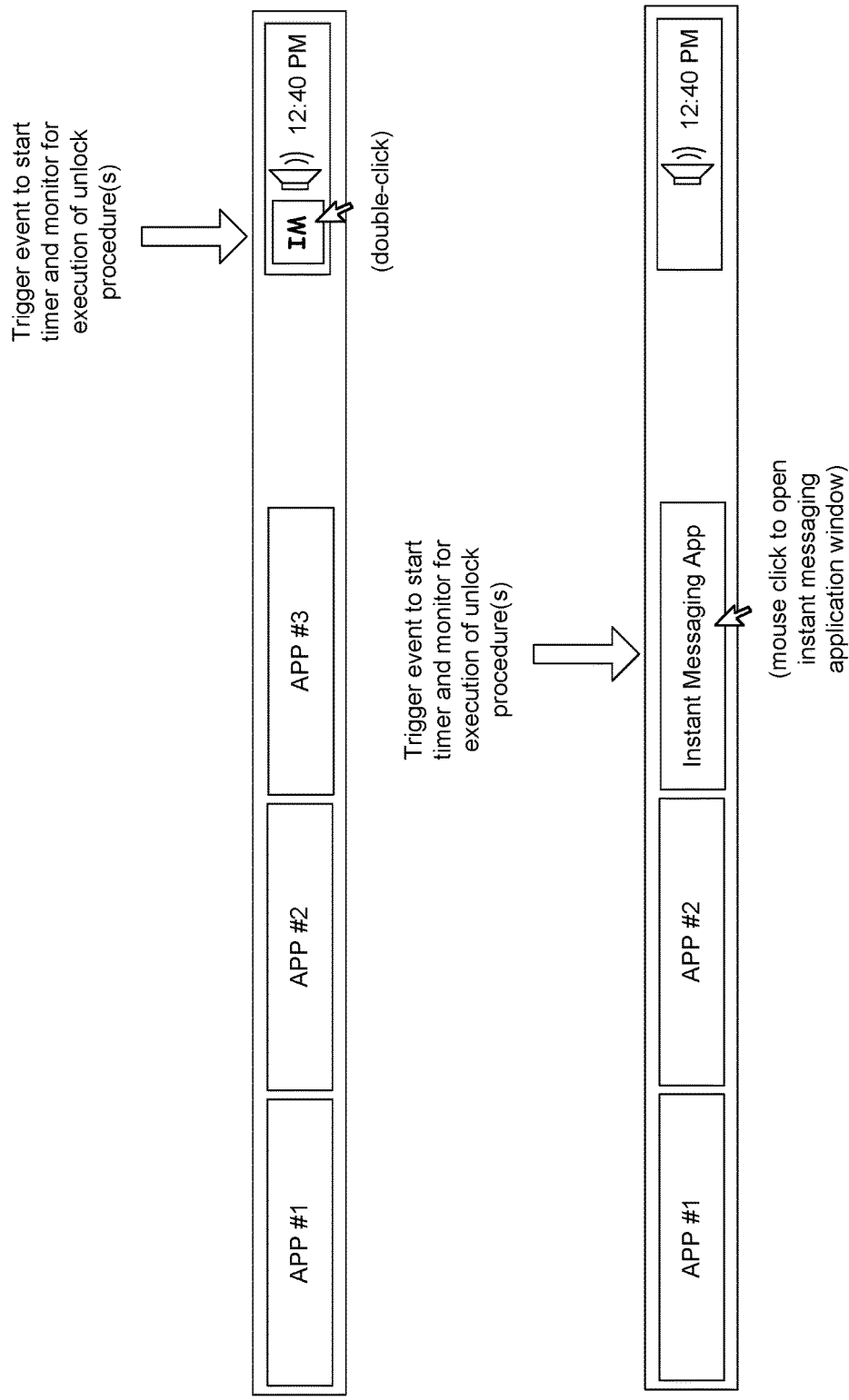
FIG. 11 illustrates examples of type 2 trigger events for purposes of launching the timer in accordance with various embodiments.

FIG. 11 illustrates examples of an event of a second type (e.g., type 2) for purposes of launching the timer 120 (FIG. 1) as part of the unlocking process for causing one or more instant message conversation records to be viewable again. For purposes of illustration, two examples of type 2 trigger events are shown. However, it should be appreciated that other type 2 trigger events may be specified by the user, and the same applies for type 1 trigger events. In the examples shown, once the event monitor 116 (FIG. 1) detects that the user clicks on the window in the taskbar to maximize the instant messaging session window, the timer 120 is automatically launched. As that point, the user is given a predetermined time interval during which the user may attempt to unlock one or more instant message conversation records. Note that upon maximizing the instant messaging session window, instant message conversation records that have been locked will remain hidden within the window until the user successfully unlocks one or more of these instant message conversation records. In some embodiments, the timer 120 executes in the background and no notification is provided to the user. Thus, only the user is aware that the timer has launched and how much time the user has to perform one or more unlock procedures. Note that for some scenarios, if the user merely switches to tabs other than the "Conversation" tab in the UI (e.g. "Contacts) generated by the instant messaging application 112 (FIG. 1), this would not constitute a type 2 event. However, switching to the "Conversation" tab from another tab (e.g., "Contacts," "Options") would constitute a type 2 event as the user is attempting to access locked conversation records.

The access controller 114 (FIG. 1) then begins monitoring for execution of unlock procedures by the user while at the same time monitoring for expiration of the timer 120. If the user correctly performs an unlock procedure (e.g., entry of a password) but the timer 120 has expired, the instant message conversation record associated with the unlock procedure remains hidden. Note that in accordance with exemplary embodiments, the user enters the one or more unlock procedures without being prompted (e.g., via a dialog box). Thus, referring to the first example in FIG. 11, the user who locked the instant message conversation records will have to be aware that a timer 120 is launched as soon as the user double-clicks on the icon in the taskbar as no prompts will be displayed to the user. Furthermore, the timer 120 executes in the background, and the user is generally unaware of the exact time left before the timer 120 expires.

If the user is not able to unlock a conversation record(s) prior to expiration of the timer 120, the user can simply restart the timer 120 by executing the same type 2 trigger event (e.g., maximizing of the instant messaging window after the window is minimized again) or a different type 2 trigger event. Note that the unlocking feature is fully customizable, and the user can configure the access controller 114 to keep unlocked conversation records viewable (i.e., accessible) even if a type 1 trigger event (e.g., minimizing of the instant messaging window) is detected. Furthermore, the unlocking feature may be configured so that if the user successfully performs an unlock procedure for a given conversation record, the timer 120 automatically restarts, thereby giving the user additional time for unlocking another instant message conversation record.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method implemented in a computing device executing an instant messaging application, comprising:
   receiving a selection from a user specifying at least one instant message conversation record to hide from view;

hiding the selected at least one conversation record from view responsive to occurrence of an event of a first type;

responsive to occurrence of an event of a second type, launching a timer, the timer being hidden from the user;

receiving an unlock procedure from the user, wherein the user enters the unlock procedure without being prompted; and responsive to the entered unlock procedure matching a predetermined unlock procedure prior to expiration of the timer, causing the corresponding hidden conversation record to be viewable and accessible by the user, wherein a time interval associated with the timer is specified by the user, and wherein the timer restarts responsive to the entered unlock procedure matching a predetermined unlock procedure prior to expiration of the timer, for receiving one or more other different unlock procedures such that a plurality of hidden instant message conversation records can be unlocked and made viewable to the user.

2. The method of claim 1, wherein each of the at least one instant message conversation record has a corresponding predetermined unlock procedure specified by the user.

3. The method of claim 1, wherein the selection specifies a plurality of instant message conversation records to hide from view, and wherein each of the plurality of instant message conversation records has a different predetermined unlock procedure specified by the user.

4. The method of claim 1, wherein the selection specifies a plurality of instant message conversation records to hide from view, and wherein each of the plurality of instant message conversation records has a same predetermined unlock procedure specified by the user.

5. The method of claim 1, wherein the selection specifies a plurality of instant message conversation records to hide from view, wherein instant message conversation records belonging to a same grouping have a same predetermined unlock procedure specified by the user, and wherein each grouping of instant message conversation records has a different predetermined unlock procedure specified by the user.

6. The method of claim 1, further comprising: responsive to the unlock procedure received from the user matching the predetermined unlock procedure, restarting the timer.

7. The method of claim 1, wherein the predetermined unlock procedure comprises one of: execution of a fingerprint scan; entry of at least one gesture via a touchscreen interface; entry of a password; entry of an answer responsive to a question; facial recognition via a camera, and speech recognition via a microphone.

8. The method of claim 1, wherein the predetermined unlock procedure comprises one of: shaking the computing device a predetermined number of times; placing the computing device at a specific global positioning system (GPS) location; coupling a predetermined device to the computing device; and causing the computing device to have a predetermined connection status.

9. The method of claim 8, wherein causing the computing device to have a predetermined connection status comprises at least one of:

connecting the computing device to a particular Wi-Fi network; and connecting the computing device to a particular Internet service provider (ISP) account.

10. The method of claim 1, wherein the event of the first type comprises one of: manipulation of a user interface (UI) button upon specifying at least one unlock procedure; minimization of a window in which the instant message conversation records are displayed; switching to another application executing on the computing device; leaving a current chatting window with a friend whose message should be locked; the computing device being turned off; the computing device entering a sleep mode; and the computing device entering a screen saver mode.

11. The method of claim 1, wherein the event of the second type comprises: restoration to view of a previously-minimized window in which the instant message conversation records are displayed; manipulation of a user interface (UI) button within a window in which the instant message conversation records are displayed; the computing device exiting a sleep mode; the computing device exiting a screen saver mode; switching from another application executing on the computing device to a window in which the instant message conversation records are displayed.

12. A system, comprising:

a memory storing instructions; and a processor coupled to the memory and configured by the instructions to at least:

display a plurality of instant message conversation records;

receive a selection from a user specifying at least one instant message conversation record to hide from view;

hide the selected one or more conversation records from view responsive to occurrence of an event of a first type;

responsive to occurrence of an event of a second type, launch a timer, the timer being hidden from the user;

receive an unlock procedure from the user, wherein the user enters the unlock procedure without being prompted; and responsive to the entered unlock procedure matching one of a plurality of predetermined unlock procedures prior to expiration of the timer, cause the corresponding hidden conversation record to be viewable and accessible by the user, wherein a time interval associated with the timer is specified by the user, and wherein the timer restarts responsive to the entered unlock procedure matching a predetermined unlock procedure prior to expiration of the timer, for receiving one or more other different unlock procedures such that a plurality of hidden instant message conversation records can be unlocked and made viewable to the user.

13. The system of claim 12, wherein the predetermined unlock procedure comprises one of: execution of a fingerprint scan; entry of at least one gesture via a touchscreen interface; entry of a password; entry of an answer responsive to a question; facial recognition via a camera, and speech recognition via a microphone.

14. The system of claim 12, wherein the predetermined unlock procedure comprises one of: shaking the computing device a predetermined number of times; placing the computing device at a specific global positioning system (GPS) location; coupling a predetermined device to the computing device; and causing the computing device to have a predetermined connection status.

15. The system of claim 14, wherein causing the computing device to have a predetermined connection status comprises at least one of:

connecting the computing device to a particular Wi-Fi network; and connecting the computing device to a particular Internet service provider (ISP) account.

16. The system of claim 12, wherein the processor is further configured by the instructions to:
receive user input categorizing each of the instant message conversation records into one of a plurality of predetermined groupings.

17. The system of claim 16, wherein the plurality of predetermined groupings comprise: a grouping for non-confidential contacts; and a grouping for confidential contacts.

18. The system of claim 16, wherein each of the plurality of predetermined groupings has a corresponding timer value.

19. The system of claim 16, wherein the selection specifies a plurality of instant message conversation records to hide from view, wherein instant message conversation records belonging to a same grouping have a same predetermined unlock procedure specified by the user, and wherein each grouping of instant message conversation records has a different predetermined unlock procedure specified by the user.

20. The system of claim 12, wherein the event of the first type comprises one of: manipulation of a user interface (UI) button upon specifying at least one unlock procedure; minimization of a window in which the instant message conversation records are displayed; switching to another application executing on the computing device; leaving a current chatting window with a friend whose message should be locked; the computing device being turned off; the computing device entering a sleep mode; and the computing device entering a screen saver mode.

21. The system of claim 12, wherein the event of the second type comprises: restoration to view of a previously-minimized window in which the instant message conversation records are displayed; manipulation of a user interface (UI) button within a window in which the instant message conversation records are displayed; the computing device exiting a sleep mode; the computing device exiting a screen saver mode; switching from another application executing on the computing device to a window in which the instant message conversation records are displayed.

22. A non-transitory computer-readable storage medium storing instructions to be implemented by a computing device having a processor, wherein the instructions, when executed by the processor, cause the computing device to at least:

receive a selection from a user specifying at least one instant message conversation record to hide from view;
hide the selected at least one conversation record from view responsive to occurrence of an event of a first type;
responsive to occurrence of an event of a second type, launch a timer, the timer being hidden from the user;
receive an unlock procedure from the user, wherein the user enters the unlock procedure without being prompted; and
responsive to the entered unlock procedure matching a predetermined unlock procedure prior to expiration of the timer, cause the corresponding hidden conversation record to be viewable and accessible by the user, wherein a time interval associated with the timer is specified by the user, and wherein the timer restarts responsive to the entered unlock procedure matching a predetermined unlock procedure prior to expiration of the timer, for receiving one or more other different unlock procedures such that a plurality of hidden instant message conversation records can be unlocked and made viewable to the user.

23. The non-transitory computer-readable storage medium of claim 22, wherein the event of the first type comprises one of: manipulation of a user interface (UI) button upon specifying at least one unlock procedure; minimization of a window in which the instant message conversation records are displayed; switching to another application executing on the computing device; leaving a current chatting window with a friend whose message should be locked; the computing device being turned off; the computing device entering a sleep mode; and the computing device entering a screen saver mode.

24. The non-transitory computer-readable storage medium of claim 22, wherein the event of the second type comprises: restoration to view of a previously-minimized window in which the instant message conversation records are displayed; manipulation of a user interface (UI) button within a window in which the instant message conversation records are displayed; the computing device exiting a sleep mode; the computing device exiting a screen saver mode; switching from another application executing on the computing device to a window in which the instant message conversation records are displayed.

* * * * *